UNITED STATES PATENT OFFICE 2,332,906

PROCESS FOR PREPARATION OF SULPHON-AMIDE DERIVATIVES

Zoltán Földi, Árpád Gerecs, István Demjén, and Rezső König, Budapest, Hungary; vested in the Alien Property Custodian No Drawing. Application June 24, 1940, Serial No. 342,190. In Hungary October 3, 1939

11 Claims. (Cl. 260—302)

We have previously found that arylsulpho derivatives 2-amino-thiazoles, in which the arylsulpho group contains an amino or a substituted or acylated amino group or other groups convertible into a group enumerated before, are either valuable therapeutics or valuable starting materials for preparing therapeutics. Such compounds are described in our U. S. applications Ser. No. 267,168 and Ser. No. 324,990 respectively. Similar properties are shown by analogous thiazole derivatives in which the aryl group is replaced by a heterocyclic ring, such as by the pyridine ring.

According to the present invention the above mentioned sulphonamide derivatives can be advantageously prepared by subjecting compounds of the general formula

A.Y.SO₂.HN.CS.NH₂ to the action of α halogeno-ketones, -aldehydes, -acetales, -hemi-acetales, or of halogeno-acetales thereof, or of esters or ethers of the enolic forms, or of α-halogeno-carboxylic acids or of their esters. In the above formula A represents an amino, alkyl-amino, acylamino, or acylated alkylamino group, or other groups, such as nitro, azo, etc. groups, which are convertible into the different amino groups enumerated before; and Y represents an aryl or a heterocyclic group.

The present invention relates further to new 2-amino-thiazole-derivatives of anticoccic action, as well as new 2-amino-thiazole-derivatives, which are suitable starting materials to prepare new 2-amino-thiazole-derivatives of anticoccic action. Such new derivatives are for example 2-arylsulphamido-thiazoles, in which oxo-alkylgroups, such as aceto-, propio-, etc. groups are present in the 4 or 5 position; 2-arylsulphoamido-thiazoles, in which the position 4 and 5 contain a bivalent aliphatic hydrocarbon chain of at least three carbon-atoms; 2-arylsulphamido-thiazoles, in which the position 4 is substituted by a hydroxy-group; and 2-arylsulphamido-thiazoles, in which the position 4 of the thiazole-ring is substituted by a hydroxy or alkoxy group and the position 5 is substituted by the carbalkoxy group. In all of these enumerated new compounds the arylsulpho-group contains in the para-position a member of the group, consisting of amino-, alkyl-amino, acyl-amino-, acylated alkylamino-, nitro-groups.

Valuable starting materials are the acylamino-arylsulpho-thioureas, as well as the thioureids of hetero-cyclic aminosulphonic acids, such as the acylamino-pyridine-sulphonyl-thiourea.

Arylsulphonyl derivatives of thioureas have been unknown until now, especially such arylsulphonyl-thioureas or thioureids of heterocyclic sulphonic acids, in which the aryl group or the heterocyclic nucleus contains amino or substituted or acylated amino groups, or other groups which are convertible into the groups enumerated above. Thiourea can not be acylated by acylating agents generally used for introduction of arylsulphonyl groups, because other reactions take place. Processes had to be created, thus, in order to obtain the starting materials of the present invention. These new starting materials can be obtained by splitting off the α-alkoxy-alkyl group from the S-(α-alkoxy-alkyl)-ethers of iso-thiourea acylated by an aromatic or heterocyclic sulphonic acid group. The starting materials for the latter process were also unknown till now. These starting materials can be obtained by subjecting iso-thiourea-ethers to the action of acylating agents suitable to introduce arylsulphonic groups or heterocyclic sulphonic acid groups. Such acylating agents are for example the arylsulpho halogenides, especially those in which the aryl group is substituted by amino, alkylamino, acylamino groups or groups (such as nitro, azo, etc. groups) convertible into the groups mentioned above.

Such acylating agents are for example the acylamino-benzol-sulpho-halogenides, such as the p-acetylamino-benzolsulphonyl chloride. Pyridine-sulphonyl halogenides also can be used, for example the 2-acetamino-pyridine-5-sulphonyl bromide may be used. One may use, preferably, as iso-thiourea-ethers the α-alkoxy-alkyl-ethers, such as the α-ethoxy-ethylether or the alkoxy-methyl-ethers, such as the methoxy-methyl or ethoxy-methyl ethers. These iso-thiourea-alkoxy-methyl ethers are preferably used in the form of their salts, as the free bases themselves are unstable. When using the salts, it is preferable to use acid binding agents, such as pyridine, sodium acetate, sodium alcoholate, etc.

Further details of the process for the obtention of arylsulpho-iso-thiourea-ethers will be found in the examples hereinafter set forth.

The removal of the alkoxy-alkyl group from the aryl-sulpho-iso-thiourea ethers can be effected preferably by alcoholysis. For this splitting off arylsulpho-iso-thiourea-alkyl ethers in which the alkyl group is an alkoxy-methyl or phenoxy-methyl group, preferably an ethoxy-methyl or methoxy-methyl group are especially suitable. The alcoholysis is effected, preferably, in the presence of acid catalysts, such as dry hydrochloric acid. The alcoholysis is effected in an absolute alcohol, containing 0.1–0.3 percent of dry hydrochloric acid. As alcohol, the methyl- or ethyl-alcohol can be advantageously used. The alkoxy-methyl groups are split off by this alcoholysis in the form of acetals of the formaldehyde. As starting materials for this hydrolysis preferably acylamino-arylsulpho- or nitro-aryl-sulpho-iso-thiourea-alkoxy-methyl ethers can be used.

Further details of the alcoholysis will be found in the examples hereinafter set forth.

As other material for the process of the present invention α-halogeno ketones, such as α-chloro-acetone, 2-chloro-butatone-3 etc. can be used. Other valuable starting materials are the α-halogeno derivatives of cyclic ketones or di-ketones or poly-ketones. Such compounds are for instance: α-chlorohexanone, the chloro- or bromo-acetylacetone (symmetric), and the bromo-di-acetyl-monoxime. One may use preferably halogeno-ketones, as well, which contain further halogen-atoms, or oxy-, alkoxy, acyloxy groups as substituents. Such compounds are, for example, the di-chloro-acetone symmetric or the α-alkoxy, α'-chloro-acetones, etc. One may use also α-halogeno-aldehydes, such as chloro-acetaldehyde, α-bromo-propionaldehyde, etc. Instead of the α-halogeno-ketones or -aldehydes one may use also their functional derivatives, such as acetals, hemi-acetals, ethers or esters of the enolic forms, etc. Such starting materials are for example the diethyl-acetal of chlor-acetaldehyde, the 1,2-dichloro-ethylether, the chloro-ethylidene-diacetate etc. Other valuable starting materials are -halogenated oxo-carboxylic acids or their derivatives. Such compounds are for example the α-chloro-α-aceto-acetic acid ethyl-ester or the chloro-pyruvic acid or its esters, etc. One may use also α-halogenated acids or their esters or nitriles. In addition, α-halogenated derivatives of di- or poly-carboxylic acids or of their esters may be used. Such compounds are for example the chloro-acetic acid, the chloroacetic acid ethylester, the bromo- or chloro-malonic acid diethyl ester, the chloro-cyan-acetic-acid-ester, etc.

The reaction between the arylsulpho-thiourea and the α-halogenated oxo-compound is preferably carried out in the presence of an acid binding agent, such as pyridine or other tertiary heterocyclic bases. The arylsulpho derivatives of the 2-amino-thiazole compounds result, in this reaction, generally in almost theoretical yield and of excellent purity, whereas the previous methods, in which the arylsulpho group is introduced into 2-amino-thiazole give generally mediocre yields. The present invention makes it possible to obtain in a single operation amino-arylsulpho-2-amino-thiazoles, whereas the previous methods lead to acylamino-arylsulpho derivatives, which then must be subjected to a deacylating treatment. Such a treatment however can not always be effected, on account of the sensitiveness of many of the products in question.

Further details concerning the preparation of the starting materials and of the end-products will be found in the following examples:

1. Thiourea and chloro-methylether are brought into interaction in acetone at room-temperature. The hydrochloride of the iso-thiourea-methoxy-methyl-ether separates. It melts at about 102°.

300 ccs. of absolute methylalcohol are cooled to −10° and 62.4 grams of chlorhydrate or iso-thiourea-methoxy-methylether are added. While stirring, the hydrochloride dissolves. Now a sodium-methylate solution is added in portions at −10°. The sodium-methylate solution has been prepared from 8.5 grams of sodium and 300 ccs. of absolute methylalcohol. After the sodium-methylate solution has been added, 42 grams of finely powdered p-acetamino-benzol-sulpho-chloride are added in portions at −10°, while stirring. The stirring is continued at −10°, then for about one hour to about 0°. The p-acetamino-benzolsulpho-iso - thiourea-methoxy-methylether separates as a crystal mass. It is now filtered, the precipitate washed with water in order to eliminate the sodium chloride, and then dried. One obtains about 40 grams of a white crystalline product, which melts at about 167°. It can be recrystallized from alcohol.

One may prepare similarly the corresponding products, starting from benzolsulpho-chloride or from p-nitro-benzolsulpho-chloride or from 2-acetamino-pyridine-5-sulphonyl bromide.

The reaction is shown in the following formulas:

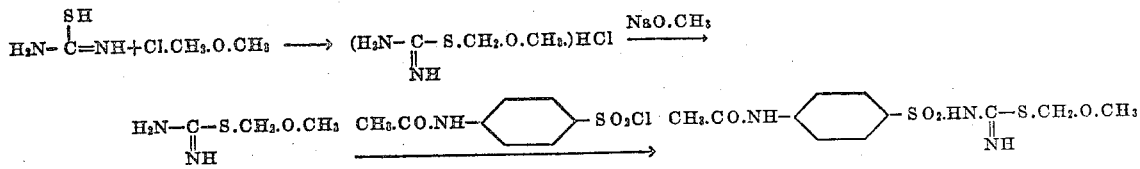

2. 37.6 grams of finely powdered p-acetylamino-benzol-sulpho-iso-thiourea - methoxy-methylether are boiled for a minute in 222 ccs. of 99% methyl-alcohol and 1.1 ccs. of absolute ethyl-alcohol, containing 33% hydrochloric acid gas. The starting material passes into solution and crystallisation occurs soon. The mixture is boiled further for 2 minutes, then allowed to cool, then cooled by ice-water. The crystals are filtered from the mixture. One obtains 25–28 grams of p-acetylamino-benzolsulpho-thiourea, as a white crystalline powder, which melts at about 200.5°. It dissolves in diluted alcohol and can be re-precipitated without alteration by acidification with acetic acid.

The splitting off of the methoxy-methyl group can be effected also in ethylalcoholic medium. Instead of the methoxy-methyl-ether of the p-acetamino-benzolsulpho-iso-thiourea, one may use the ethoxymethylether or the α-ethoxy-ethylether as well. Instead of the p-acetamino-benzolsulpho-iso-thiourea ethers one may use the corresponding p-nitro-benzolsulpho-iso-thiourea ethers. In this case, the p-nitro-benzol-sulpho-thiourea is obtained. From 2-acet-amino-pyridine-5 - sulpho-iso-thiourea-methoxy - methyl-ether the 2-acetamino-pyridine-5-sulpho-thio-urea is obtained.

The reaction is shown in the following formulas:

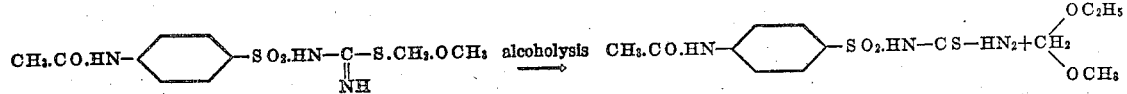

3. 13.6 grams of p-acetyl-amino-benzolsulpho-thiourea, 14 grams of chloro-acetone and 340 ccs. of alcohol of 80% are boiled for an hour, then evaporated in vacuo. The residue is ground with 30 ccs. of dry acetone, the precipitate filtered and washed with 20 ccs. of acetone. One obtains 9-10 grams of p-acetylamino-benzolsulpho-2-amino-4-methyl-thiazole, which melts without further purification at 252-257° with decomposition; it forms a white powder.

The reaction is illustrated by the following formulas:

acetamino-benzolsulpho-thiourea on 1-chloro-butanone-2, the p-acetamino-benzolsulpho-2-amino-4-ethyl-thiazole (melting point at about 218°) and the p-amino-benzolsulpho-2-amino-4-ethylthiazole (melting point at about 134°), respectively, may be prepared. Similarly by acting on 1,1-dichloro-acetone the p-acetamino-benzolsulpho-2-amino-4-methyl 5-chloro-thiazole (melting point at about 217°) and the p-amino-benzolsulpho-2-amino-4-methyl-5-chloro-thiazole (melting point indefinite, at about 260°) respectively may be obtained.

 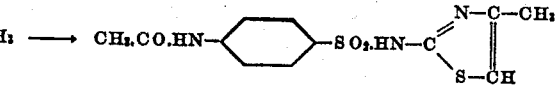

5 grams of this product are boiled with 50 ccs. of 2-normal sodium hydroxide solution for half an hour and then cooled. The solution is then neutralised with acetic acid. 3.9 grams of p-amino-benzolsulpho-2-amino-4-methyl-thiazole separates, which forms, in this stage, a white powder and melts at about 237°, with decomposition.

4. 13.6 grams of p-acetamino-benzolsulpho-thiourea, 14 grams of chloracetone, 14 grams of pyridine and 200 ccs. of alcohol of 80% are boiled for an hour on the water-bath. The reaction-mixture is evaporated in vacuo to dryness, the residue ground with water, filtered and dried. The p-acetamino-benzolsulpho-2-amino-4-methyl-thiazole has been found in theoretic yield. It forms without further purification a white crystalline powder, which melts, with decomposition at about 257°.

5. 27.3 grams of p-acetamino-benzolsulpho-thiourea, 18.6 grams of chloracetone, 20 ccs. of pyridine are mixed. An exothermic reaction occurs, the materials pass temporarily into solution. The mixture is then kept for 2 hours on the water-bath. On addition of 40-60 ccs. of water, the p-acetamino-benzolsulpho-2-amino-4-methyl-thiazole separates as white crystalline powder. The yield is theoretical.

6. 27.3 grams of p-acetamino-benzolsulpho-thiourea, 9.3 grams chlor-acetone and 10 ccs. of pyridine are mixed. An exothermic reaction and solution occurs, followed by an abundant precipitation of a crystal pulp. The mixture is kept for half an hour in the water-bath, then, after cooling, diluted with water and suction filtered after standing. The p-acetamino-benzolsulpho-2-amino-4-methyl-thiazole is obtained in nearly theoretical yield as a white crystalline powder.

7. 8.6 grams of α,β-dichloro-diethyl-ether, 10 ccs. of alcohol and 10 ccs. of water are refluxed for half an hour in a boiling water-bath, and then 13.6 grams of p-acetamino-benzolsulpho-thiourea and 22 ccs. of pyridine are added. The mixture is kept for half an hour in the boiling water-bath, then evaporated to dryness, in vacuo. On addition of 100 ccs. of water to the residue the p-acet-amino-benzolsulpho-2-amino-thiazole crystallises out. The yield is about 90% of the theoretical. The product crystallises from aqueous alcohol in white crystals.

In a similar manner by action of p-acetamino-benzolsulpho-thiourea on 3-chloro-butanone-2 the p-acetamino-benzolsulpho-2-amino-4,5-dimethyl-thiazole (melting point at about 264°), and the p-amino-benzolsulpho 2-amino-4,5-dimethyl-thiazole (melting point at about 248°), respectively may be prepared. By action of p-

One may prepare likewise from 2-acetamino-pyridine-5-sulpho-thiourea with α-chloroacet-aldehyde or chloro-acetone the 2-acetamino-pyridine-5-sulpho-2-amino-thiazole or 4-methyl-thiazole respectively.

One may prepare also from p-nitro-benzol-sulpho-thiourea and chloro-acetone the p-nitro-benzolsulpho-2-amino-4-methyl-thiazole- which crystallises from aqueous acetone in well developed yellow crystals, melting under decomposition at 200°. This product yields in an alcoholic suspension on hydrogenation, in the presence of palladium as catalyst, the p-amino-benzolsulpho-2-amino-4-methyl-thiazole.

8. 22 grams of p-acetylamino-benzolsulpho-thiourea, 14 grams of α-chloro-acetoacetic-ethyl ester and 22 ccs. of dry pyridine are mixed. The temperature rises to 80°; in order to moderate the reaction the mixture is cooled with water. The pale yellow melted mixture is then kept for 10 minutes in a boiling water bath, then diluted by 400 ccs. of water. The oil, which precipitates crystallises quickly. It is suction filtered and washed with water. The ethyl-ester of 2-(p-acetylamino-benzolsulphamido)-4-methyl-thiazole-5-carboxylic acid is obtained in theoretical yield. It melts at 247-49°. The product can be recrystallised from large amounts of hot alcohol.

On saponification by means of diluted sodium hydroxide the acetyl group is split off and the carbethoxy group, as well, is saponified. 1 gram of the above described product is boiled in 10 ccs. of sodium hydroxide of 10 percent by volume for half an hour, then acidified, by adding about 2 ccs. of conc. hydrochloric acid. White crystalline powder separates, which is suction filtered and washed by water. One obtains 0.75 gram of 2-(p-amino-benzolsulphamino)-4-methylthiazole-5-carboxylic acid, which can be recrystallised from about thirty times the amount of methylalcohol. The product shows two melting points, the first being at about 176-183°, while the second occurs at about 237°. If only the acetyl group is desired to be split off, while the carbethoxy group is left unaltered, one may proceed as follows: 4 grams of 2-(p-acetylamino-benzolsulphamido)-4-methyl-5-carbethoxy-thiazole are boiled in 20 ccs. of absolute alcohol containing about 1.6 grams of hydrochloric acid gas. After boiling for about 8-10 minutes a white crystalline mass separates. After having been boiled for an hour, the reaction mixture is cooled, the crystals suction filtered and washed with cold alcohol. One obtains in nearly theoretical amount the hydrochloride of the 2-(p-amino-benzolsulphamido)-4-methyl-5-carbeth-oxy-thiazole, which melts with decomposition at 230–231°. One may obtain the free base in likewise theoretical yield by treating the hydrochloride with sodium acetate solution. The product can be recrystallised from about six times the amount of boiling alcohol and melts at about 196°. It shows an excellent anticoccic action.

9. 1.15 grams of p-amino-benzolsulpho-thiourea, 0.85 gram of α-chloro-acetoacetic acid ethylester and 2 ccs. of pyridine are mixed. Dissolution and elevation of temperature occurs. The mixture is kept for a quarter of an hour in a boiling water-bath, then 20 ccs. of water are added. On longer standing crystals separate, which are suction filtered and washed by water. One obtains in nearly theoretical amount the 2-(p - amino - benzolsulphamido)-4-methyl-5-carbethoxy-thiazole, which melts, thus prepared, at 130–134° and is probably an isomer of the corresponding product described in Example 8. A sample of the product melting at 130–134°, dissolved in sodium hydroxide and reprecipitated by acidification with acetic acid, gives a product, which melts at more than 30° higher than originally.

When in the above two examples the methyl-, butyl-, amyl-, or benzyl-, etc., esters of the chloro-aceto-acetic acid are used instead of the ethylester one obtains the corresponding thiazole derivatives, in which the carboxylic group in the position 5 is esterified by the corresponding alcohols.

When starting from the α-chloro-aceto-acetdiethyl-amide, one obtains the thiazole derivative, in which the position 5 is substituted by the diethyl-carboxyl amide group.

When using the p-nitro-benzolsulpho-thiourea, one obtains the p-nitro-benzolsulpho-2-amino-4-methyl-thiazole-5-carboxylic acid derivatives.

10. 2.7 grams of mono-chloro-acetylacetone symmetric, 5.5 grams of p-acetylamino-benzolsulpho-thiourea and 6 ccs. of dry pyridine are mixed. A violent reaction takes place. The pale yellow melted mixture solidifies in crystals, on standing. After addition of 40 ccs. of water it is ground and suction filtered and washed by water. One obtains, in theoretical amount, the 2-(p-acetamino-benzolsulphamido) - 4 - methyl - 5 - aceto-thiazole, which does not melt until 280°.

2.5 grams of this product are boiled in 20 ccs. of sodium hydroxide of 10 per cent by volume and in 5 ccs. of water. The pale yellow solution is acidified by 2.5 ccs. of glacial acetic acid. The precipitate is filtered, washed by water and dried. The product is boiled with 9 ccs. of absolute alcohol, then cooled and filtered. One obtains the 2 - (p-aminobenzolsulphamido) -methyl-5-aceto-thiazole, which melts at 213–14°.

The same product can be obtained by condensing mono-chloro-acetylacetone with p-amino-benzolsulphothiourea.

11. 3.6 grams of the mono-bromo-diacetyl-monoxime according to the formula:

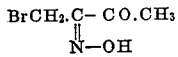

and 5.5 grams of p-acetamino-benzolsulpho-thiourea and 6 ccs. of dry pyridine are mixed. Under elevation of temperature a yellowish melt is formed, which is kept some minutes on the water-bath, then cooled and diluted with 20 ccs. of water. On cooling and standing white crystals separate, which are suction filtered and washed with water. One obtains the 2-(p-acetylamino-benzolsulphamido) - 4 - aceto - thiazole - oxime, which melts at about 204°. It dissolves readily in ½-normal sodium hydroxide.

On splitting off the acetyl group as well as the hydroxylamine by hydrolysis, one obtains the corresponding 4-aceto-derivative.

12. 132 grams of α-chloro-cyclohexanone, 273 grams of p-acetamino-benzolsulpho-thiourea and 300 ccs. of dry pyridine are stirred and warmed on the water-bath. The reaction components go into solution. Then the mixture is cooled and the thick syrup is mixed with 2 litres of water. An oil separates, which soon crystallizes. After standing the crystals are filtered, washed and dried. For further purification they can be crystallised from large amounts of hot alcohol of 90%. One obtains the 4.5-tetramethylene-2-(p-acetyl - amino - benzolsulphamido) - thiazole, which melts at about 265–280°.

This product, boiled with eight times the amount of sodium hydroxide of 10 per cent by volume for half an hour and then acidified by hydrochloric acid, yields the 4,5-tetramethyl-2-(p-amino-benzolsulphamido) - thiazole, melting at about 244°. The product has anticoccic action.

When using, instead of p-acetylamino-benzolsulphothiourea, the p-amino-benzolsulpho-thiourea, one obtains directly the product described above.

One may obtain similarly from 2 - chloro - methylcyclo-hexanone the compounds of the formula:

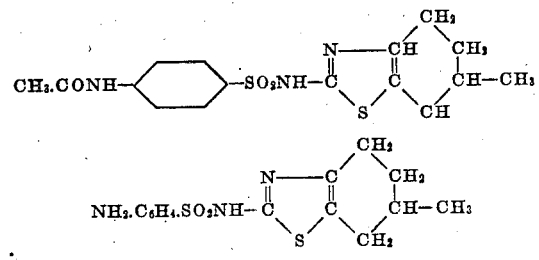

Starting from the cyclic α-halogeno-ketones mentioned in this example and condensing them with p-nitro-benzolsulpho-thiourea or with benzolsulphothiourea, one obtains the corresponding nitrobenzolsulphonyl- or benzolsulphonyl-aminothiazole derivatives.

13. 7.5 grams of ethyl chloro-acetate, 16.5 grams of p-acetamino-benzolsulpho-thiourea and 18 ccs. of pyridine are mixed. The temperature rises to about 40° and a dissolution occurs. After heating on the waterbath for about a quarter of an hour, the mixture is diluted by 150 ccs. of water, and the p-acetylamino-benzol-sulpho-2-amino-4-oxy-thiazole separates as a crystalline powder. The yield is about 75% of the theoretical. It decomposes at 258–59°.

14. 12.5 grams of ethyl chloro-acetate, 23 grams of p-amino-bensolpho-thiourea and 30 ccs. of pyridine are mixed. A slight elevation of the temperature takes place and the materials go into solution. The mixture is then heated on a water-bath for half an hour, then diluted by 150 ccs. of warm water. On cooling the p-amino - benzolsulpho-2-amino - 4 - oxy - thiazole crystallises in compact crystals, melting at 235–37°. The yield is about 60% of the theoretical.

15. 4 grams of chloro-malonic diethyl ester, 5.5 grams of p-acetamino-benzolsulpho-thiourea and 6 ccs. of pyridine are mixed, then heated at about 60° for a quarter of an hour. One obtains a homogeneous yellow syrup, which solidifies after standing for 2 hours. On addition of 70 ccs. of water, the crystals dissolve, followed soon by precipitation of white crystals. One obtains 7.05 grams of crystals, melting at 164° with development of gas. The product is recrystallisable from alcohol, the melting point rising thus to 165–166°. The product is the 4-oxy- or 4-ethoxy derivative of p-acetamino-benzolsulpho-2-amino-5-carbethoxy-thiazole.

16. 4.8 grams of bromo-malonic diethylester, 4.6 grams of p-amino-benzolsulpho-thiourea and 6 ccs. of pyridine are mixed and the temperature rises to about 75°. The yellow thick syrup thus formed, is heated on the water-bath for 10 minutes, then allowed to stand for an hour and a half, and then diluted by 80 ccs. of water. The homogeneous solution deposits 5.9 grams of pale yellow crystals, which melt between 136–138°. This product recrystallised from alcohol, melts at 138–139°, with decomposition. The product is the deacetylated derivative of the product described in the preceding example.

17. 62 grams of p-acetamino-benzolsulphothiourea, 33 grams dichloro-acetone symmetric and 17–18 grams of pyridine are heated in 100 ccs. of alcohol of 80% on the water-bath. One obtains a solution which is boiled further for 10 minutes, then poured into 450 ccs. of ice-water. The crystals separated on long standing are collected and washed with water. They are dried in vacuo. One obtains about 71 grams of p-acetamino - benzolsulpho - 2 - amino-4-chloro - methyl-thiazole, which melts at about 203°, with decomposition.

When using p-amino-benzolsulpho-thiourea instead of p - acetyl-amino-benzolsulpho-thiourea, one obtains the p-amino-benzolsulpho-2-amino-4-chloromethyl-thiazole.

10 grams of p-acetamino-benzolsulpho-2-amino-4-chloromethyl-thiazole are boiled on a water-bath in 100 ccs. of absolute alcohol containing about 10% of hydrochloric acid gas. After about half an hour a complete dissolution takes place, followed soon by crystallisation. The mixture is boiled further for 10 minutes, then cooled, the crystals are collected, washed by absolute alcohol and dried in vacuo. One obtains the hydrochloride of the p-amino-benzolsulpho-2-amino-4-chloromethyl-thiazole, which does not melt until 290°.

3 grams of this hydrochloride are shaken with 50 ccs. of acetic ether and 20 ccs. of sodium acetate solution of 10%. After dissolution has been observed, the acetic ether layer is separated, dried upon sodium sulphate and evaporated in vacuo. The residue is crystallised from glacial acetic acid.

One obtains the p-amino-benzolsulpho-2-amino-4-chloromethyl-thiazole, melting at 120°. As the chloro-atom is very reactive, it is advisable to make the above described operations at low temperature and without loss of time, in order to restrict the hydrolysing effect of the water.

5 grams of p-acetamino-benzolsulpho-2-amino-4-chloromethyl-thiazole are boiled with 50 ccs. of hydrochloric acid of 10% for half an hour, and then the acidity partially neutralised by ammonia. Impurities separate, which are filtered and the filtrate treated with animal charcoal. The filtered solution is now completely neutralised by ammonia. On cooling the p-amino-benzolsulpho-2-amino-4-oxymethyl-thiazole crystallises; it melts at about 201°.

When condensing α-methoxy-α'-chloro-acetone with p-amino-benzolsulpho-thiourea, one obtains the methyl-ether of the above-described product. When condensing p-acetamino-benzolsulpho-thiourea with 4-amino- or 4-acetamino-α-chloro-acetophenone, one obtains the p-acetamino-benzolsulpho-2-amino 4-(p'-amino-phenyl)-thiazole—melting point at 173–175°—, or the 4-(p' - acetamino - phenyl)-thiazole — melting point at 280–281°—respectively.

By condensing p-amino-benzolsulpho-thiourea with 4-amino- or 4-acetamino-α-chloro-acetophenone, one obtains the p-amino-benzolsulpho - 2 - amino -(p'- amino - phenyl) - thiazole—melting point at 102–103°—or the -(p'acetamino-phenyl)-thiazole—melting point at 275–77°—respectively. By condensing p-amino-benzolsulpho-thiourea with 4-chloroaceto-pyrocatechine, one obtains the p-amino-benzolsulpho-2-amino-4-(3',4'-dioxy-phenyl)-thiazole.

The experimental conditions given in the examples can be varied in many other respects as well.

What we claim is:

1. A process for preparing sulphonamide derivatives in which thioureids of the general formula:

$$A.Y.SO_2.HN.CS-NH_2$$

are subjected to the action of a member of the group consisting of: α-halogeno-ketones, α-halogeno-aldehydes, α-halogeno-acetals, α-halogeno-hemiacetals, α-halogeno-halogenoacetals, α-halogeno-enolethers, α-halogeno-enolesters, α-halogeno-carboxylic acids, and α-halogeno-carboxylic acid esters, A of the formula being a member of the group consisting of amino, alkyl-amino, acylated amino, acylated alkylamino, nitro, and azo, Y of the formula being a member of the group consisting of aryl and heterocyclic radicals.

2. A process as claimed in claim 1, in which acyl-amino-arylsulpho-thiourea is used as thioureide.

3. A process as claimed in claim 2, in which p-acyl-amino-benzolsulpho-thiourea is used as thioureide.

4. A process as claimed in claim 1, in which p-amino-benzolsulpho-thiourea is used as thioureide.

5. A process as claimed in claim 1, in which a member of the group consisting of p-acetyl-amino-benzolsulpho-thiourea, p-amino - benzolsulpho - thiourea, and p - nitro - benzolsulpho-thiourea is subjected to the action of chloroacetone.

6. A process as claimed in claim 1, in which a member of the group consisting of p-acetyl-amino-benzolsulpho-thiourea, p - amino - benzolsulpho-thiourea, and p-nitro-benzolsulpho-thiourea is subjected to the action of chloro-acetaldehyde.

7. A process is claimed in claim 1, in which a member of the group consisting of p-acetyl-amino-benzolsulpho - thiourea, p-amino-benzolsulpho - thiourea, and p - nitro - benzolsulpho-thiourea is subjected to the action of α-halogenated cyclic ketones.

8. A process as claimed in claim 1, in which a member of the group consisting of p-acetyl-amino-benzolsulpho-thiourea, p-amino - benzolsulpho - thiourea, p - nitro - benzolsulpho - thiourea is subjected to the action of an α-halogeno-oxo compound containing as further substituents a member of the group consisting of oxy, alkoxy, acyloxy-halogene.

9. The process of condensing an arylsulpho-thiourea containing the linkage $Y.SO_2-HN-$ CS—NH₂ in which Y is a member of the group consisting of aryl and heterocyclic radicals with α-halogenated oxo-compounds in the presence of an acid binding agent.

10. A process as claimed in claim 9, in which the acid binding agent is a heterocyclic compound with a tertiary nitrogen-atom.

11. The process of claim 9 in which the acid binding agent is pyridine.

ZOLTÁN FÖLDI.
ÁRPÁD GERECS.
ISTVÁN DEMJÉN.
REZSŐ KÖNIG.